(12) United States Patent
Dittrich et al.

(10) Patent No.: US 8,424,957 B2
(45) Date of Patent: Apr. 23, 2013

(54) METHOD FOR OPERATING A MOTOR VEHICLE WITH A WIND DEFLECTOR, A ROOF ARRANGEMENT AND A REAR AIR-GUIDING DEVICE

(75) Inventors: Wolfgang Dittrich, Bietigheim-Bissingen (DE); Kurt Pfertner, Friolzheim (DE); Jurgen Bayer, Weissach (DE); Thomas Aussem, Magstadt (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 0 days.

(21) Appl. No.: 12/547,715

(22) Filed: Aug. 26, 2009

(65) Prior Publication Data

US 2010/0078963 A1 Apr. 1, 2010

(30) Foreign Application Priority Data

Oct. 1, 2008 (DE) .......................... 10 2008 049 987

(51) Int. Cl.
*B62D 35/00* (2006.01)
*B60J 7/22* (2006.01)

(52) U.S. Cl.
USPC ....................................... 296/180.5; 296/217

(58) Field of Classification Search ............... 296/180.1, 296/180.5, 217
See application file for complete search history.

(56) References Cited

U.S. PATENT DOCUMENTS

| 5,184,527 | A | * | 2/1993 | Nakamura | 477/110 |
| 5,188,420 | A | * | 2/1993 | Maeda et al. | 296/223 |
| 6,082,812 | A | * | 7/2000 | Lenkens et al. | 296/214 |
| 7,708,335 | B2 | * | 5/2010 | Wegener | 296/180.5 |
| 2001/0017479 | A1 | * | 8/2001 | Birndorfer et al. | 296/217 |

FOREIGN PATENT DOCUMENTS

| DE | 198 22 006 | 11/1999 |
| DE | 101 38 027 | 3/2003 |

* cited by examiner

*Primary Examiner* — Dennis Pedder
(74) *Attorney, Agent, or Firm* — Gerald E. Hespos; Michael J. Porco; Matthew T. Hespos

(57) ABSTRACT

A motor vehicle (1) has a wind deflector (13) adjacent an upper cowl (8), a roof arrangement (10) behind the wind deflector (13) and an air-guiding device (16) behind the roof arrangement (10). The wind deflector (13) is extended into a first operative position (WS1) and the rear air-guiding device (16) is transferred into first lifting position (HS1) if the roof arrangement (10) is open and if the driving speed (VF) of the motor vehicle (1) is below a predetermined first value (V1). The wind deflector (13) is transferred into a second operative position (WS2) and the rear air-guiding device (16) is transferred into a second lifting position (HS2) above the first lifting position (HS1) if the roof arrangement (10) is open and if the driving speed (VF) is above a predetermined, second value (V2).

17 Claims, 2 Drawing Sheets

METHOD FOR OPERATING A MOTOR VEHICLE WITH A WIND DEFLECTOR, A ROOF ARRANGEMENT AND A REAR AIR-GUIDING DEVICE

This application claims priority under 35 USC 119 to German Patent Application No. 10 2008 049 987.0 filed on Oct. 1, 2008, the entire disclosure of which is incorporated herein by reference.

BACKGROUND OF THE INVENTION

1. Field of the Invention

The invention is relates to a method for operating a motor vehicle with a wind deflector, an adjustable roof arrangement and a rear air-guiding device.

2. Description of the Related Art

DE 198 22 006 A1 discloses a method for operating a motor vehicle that has a wind deflector, an adjustable roof arrangement and a rear air-guiding device. The vehicle has a roof opening that can be opened by the adjustable roof arrangement, for example a displaceable roof element. The front wind deflector is assigned to the upper cowl of the windscreen frame and accordingly is attached to the front edge of the roof opening. The wind deflector can be adjusted between a retracted inoperative position and at least one extended operative position. The inoperative position is taken up when the roof is closed while the extended operative position is set when the roof is open. A second wind deflector is arranged at a distance behind the front wind deflector and is displaceable along the roof opening as a function of the driving speed and is designed with an adjustable angle of incidence. An air-guiding device is provided on the rear edge of the roof opening, i.e. behind the second wind deflector, and is designed as a fixed roof spoiler.

DE 101 38 027 A1 describes a motor vehicle with a displaceable roof opening that has a plurality of movable roof elements. A roof spoiler can be adjusted along the longitudinal struts of the roof as a function of the vehicle speed. The adjustment angle or the deployment height of the roof spoiler can be adjusted as a function of driving speed. Furthermore, the roof spoiler is adjusted as a function of the position of the roof. However, the vehicle does not have a front wind deflector assigned to the upper cowl.

It is the object of the invention to provide a method for operating a motor vehicle to optimize the aerodynamics.

SUMMARY OF THE INVENTION

The invention relates to a method and apparatus for operating a vehicle with an optimized aerodynamic balance, irrespective of whether the roof arrangement is in a closed position, an open position or a partial open position. It also has been recognized that the wind deflector does not have to be in its completely extended operative position at every speed of the vehicle to reduce the "booming" of the sliding roof. Therefore, the invention advantageously proposes that the wind deflector should only take up its first operative position if the driving speed of the motor vehicle lies below a predetermined first adjustment value of the speed. Until the first adjustment value is reached, there is the risk of the "booming" of the sliding roof. This customarily involves driving speeds of around approximately 50 km/h. However, this value may be greater or smaller depending on the size of the roof opening and the deployment height of the wind deflector. Up to this first adjustment value, the rear air-guiding device is displaced from its lowered position into its first lifting position. Therefore, when the roof arrangement is in the open position, the unfavorable effect of the roof arrangement on the air flow over the roof as far as the rear air-guiding device is compensated for if the air-guiding device takes up its first lifting position. The wind deflector takes up its second operative position, which lies below the first operative position, if the driving speed exceeds a second adjustment value of the speed that is greater than or equal to the first adjustment value, and if the roof arrangement is in its open position. The wind deflector therefore is retracted again by a certain distance, but the second operative position is higher than the inoperative position. The rear air-guiding device is extended again at the driving speed (second adjustment value), and takes up its second lifting position, which lies above the level of the first lifting position. Retraction of the wind deflector reduces influence on the air flow flowing over the roof. However, the open roof arrangement causes an air flow that changes continuously as far as the rear air-guiding device. This disadvantageous circumstance is taken into consideration by the rear air-guiding device being raised into its second lifting position.

In the open position, the roof arrangement preferably opens up a roof opening completely or partially by displacing a sliding roof element. If the sliding roof element is opened linearly, the wind deflector is extended. In the open position, the sliding roof element preferably is moved over a fixed roof portion of the roof arrangement. This therefore preferably involves an "externally running sliding roof" which, in the open position, lies above the level of the roof and therefore has a clear influence on the aerodynamics of the motor vehicle. The invention therefore in particular is directed to a motor vehicle with such an externally running sliding roof, but is not limited thereto and may also be used in vehicles having different roof arrangements.

The wind deflector is held in its inoperative position if the roof arrangement, in particular the sliding roof element, takes up a pivoted ventilation position. It is customary here for the sliding roof element to be deployed up or down about its front edge about a pivot axis, thus enabling a ventilation opening of greater or less size to be opened between the sliding roof element and fixed roof skin. Nevertheless, the rear air-guiding device takes up its first lifting position if the driving speed of the motor vehicle lies below a third adjustment value of the speed. However, the first and third adjustment values may be the same.

The wind deflector may be held in its inoperative position if the roof arrangement takes up the pivoted ventilation position, and the rear air-guiding device takes up its second lifting position if the driving speed of the motor vehicle lies above a fourth adjustment value of the speed. The third and the fourth adjustment values may be the same. The second and the fourth adjustment values also can be the same.

Continuous movement of the rear air-guiding device and/or the wind deflector generally will be considered undesirable. Thus, a delayed movement of the air-guiding device and/or the wind deflector may be initiated if the driving speed decreases again, i.e. drops below the adjustment value, for example the first or third adjustment value. More particularly, the wind deflector and the rear air-guiding device remain in their respectively current adjustment position for a certain predeterminable period of time if the respective adjustment value of the vehicle speed is reached or fallen short of. Thus, a continuous movement of the wind deflector and air-guiding device is prevented if the vehicle speed fluctuates about the respective adjustment value.

The invention may further enable the rear air-guiding device to retract completely to its lowered position at a fifth adjustment value irrespective of the position of the wind deflector or of the roof arrangement. The fifth adjustment value preferably is significantly lower than the first adjustment value.

The invention is explained in more detail below using an exemplary embodiment and with reference to the drawings, each of which shows in a greatly simplified representation the silhouette of a motor vehicle in a side view of the roof region lying above a belt line.

DETAILED DESCRIPTION OF THE PREFERRED EMBODIMENTS

Figure 1:
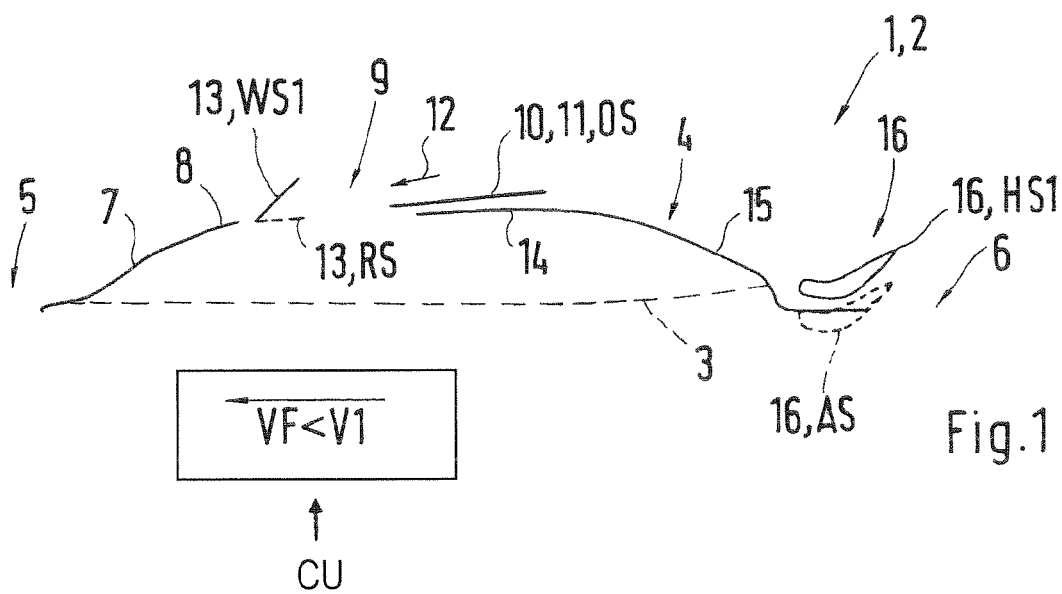
FIG. 1 shows the motor vehicle with an extended wind deflector, an open roof arrangement and an extended air-guiding device in a first lifting position.

FIG. 1 is greatly simplified side view of a motor vehicle 1 that has a body 2 with a belt line 3 shown by dashed lines. The silhouette or profile of the portion of the body 2 above the belt line 3 is identified by the numeral 4. The front end 5 of the vehicle 1 is on the left in FIG. 1 and the rear end 6 of the vehicle 1 is on the right in FIG. 1. Starting from the front end 5 of the vehicle 1 and proceeding rearward, the body profile 4 rises above the belt line 3 along the windscreen 7 as far as an upper cowl 8, which also could be referred to as the upper windscreen frame. The upper cowl 8 is adjoined by a roof opening 9 that continues the body profile 4 approximately horizontally rearward. An adjustable roof arrangement 10 enables the roof opening 9 to be closed or at least partially or completely opened. The roof arrangement 10 has a sliding roof element 11 for closing the roof opening 9. FIG. 1 shows the sliding roof element 11 in its completely open position OS. However, the sliding roof element 11 can be displaced in the direction indicated by the arrow 12 into the roof opening 9 to reach a closed position (not shown) for the adjustable roof arrangement 10.

The adjustable roof arrangement 10 also has a wind deflector 13 that is shown by a solid line in FIG. 1 in a completely extended, first operative position WS1. The wind deflector 13 also can be moved to a retracted inoperative position RS indicated by a dashed line in FIG. 1. The wind deflector 13 is in the retracted inoperative position RS and below the sliding roof element 11 when the sliding roof element 11 is in the closed position. On the other hand, the wind deflector 13 is in the extended, first operative position WS1, when the sliding roof element 11 is open so that the wind deflector 13 protrudes over the roof contour or body profile 4.

The roof opening 9 is adjoined by a preferably fixed roof portion 14 that continues the body profile 4 approximately horizontally or in a slightly dropping manner and which finally merges into an obliquely dropping rear window 15. The rear window 15 is adjoined by the vehicle rear 6 with an air-guiding device 16. The vehicle rear 6 can continue the body profile further in an obliquely dropping or approximately horizontal manner. The rear air-guiding device 16 is located approximately level with the belt line 3 and can be arranged, for example, on a boot lid or tailgate into which the rear window 15 can be integrated. FIG. 1 shows the adjustable air-guiding device 16 by dashed lines in a lower or retracted lowered position AS. FIG. 1 also shows the air-guiding device 16 in a first, extended lifting position HS1 by a solid lines. The lifting position HS1 therefore lies above the lowered position AS. In the first lifting position HS1, the air-guiding device 16 protrudes over the profile 4 of the body 2.

Figure 2:
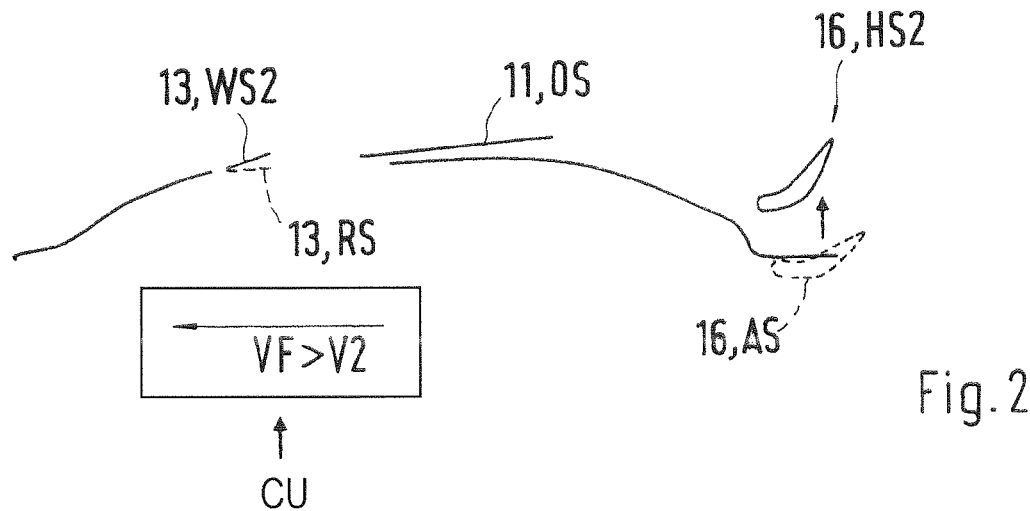
FIG. 2 shows a partially retracted wind deflector when the roof arrangement is open, and an air-guiding device in its second lifting position.

The rear air-guiding device 16 can be raised to a second lifting position HS2, as shown by the solid line depiction in FIG. 2. The second lifting position HS2 is raised in relation to the first lifting position HS1. Additionally, the air-guiding device 16 can be displaced about a pivot axis (not shown) running perpendicularly to the plane of the drawing. This pivoting of the air-guiding device 16 customarily is referred to as a change in the angle of incidence. The wind deflector 13 is lowered from the first operative position WS1 to a second operative position WS2 if the air-guiding device 16 is in its second lifting position HS2. The second operative position WS2 of the wind deflector 13 still is above the inoperative position RS, which again is shown by dashed lines in FIG. 2. The sliding roof element 11 is therefore also in the open position OS in FIG. 2.

Figure 3:
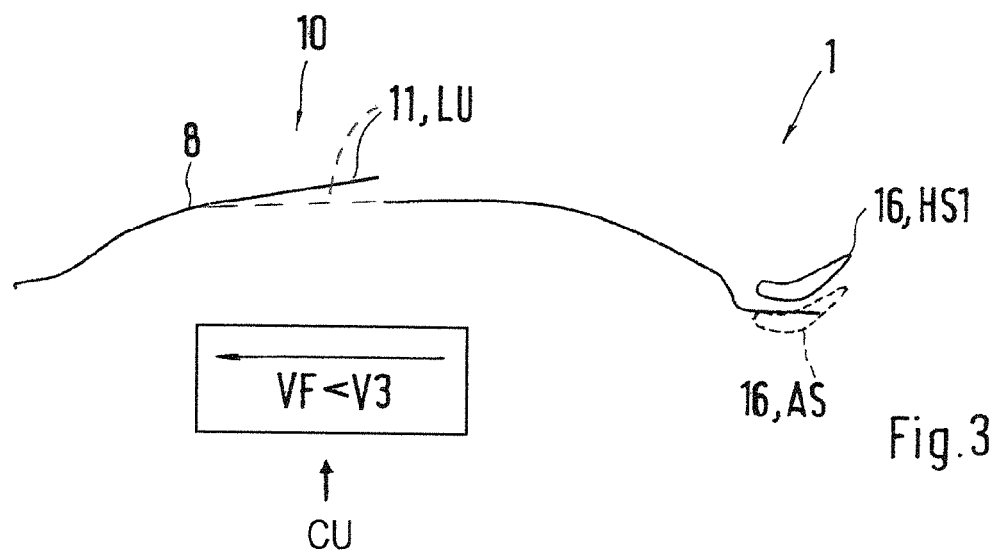
FIG. 3 shows the sliding roof in a ventilation position and with a retracted wind deflector and the air-guiding device in its first lifting position.
Figure 4:
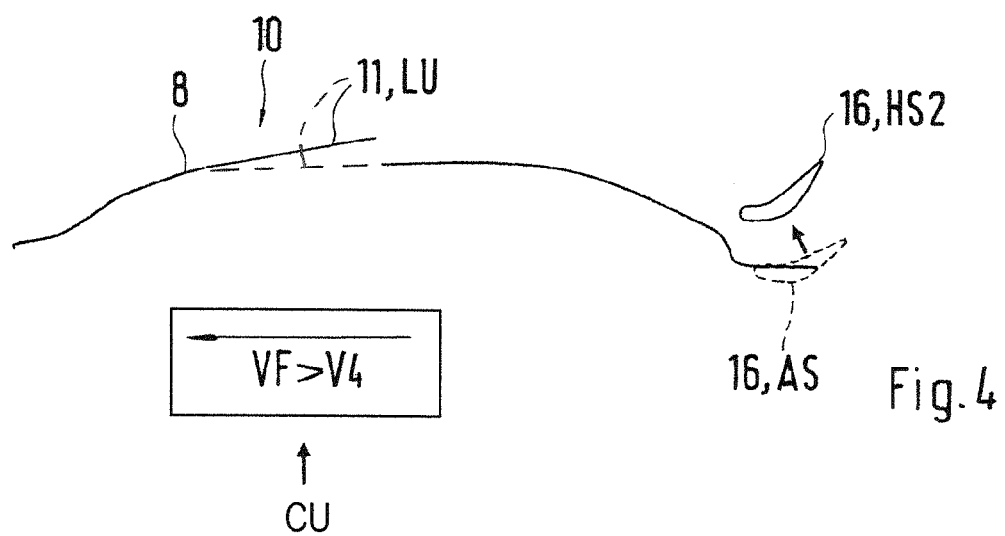
FIG. 4 shows the air-guiding device in its second lifting position with a sliding roof in the ventilation position and with a retracted wind deflector.

The wind deflector 13 assumes the inoperative position RS in FIG. 3, even though the wind deflector 13 is not shown in FIG. 3. The roof element 11 is displaced into a ventilation position LU and, for this purpose, is deployed outwards, for example about a pivot axis (not shown) running perpendicularly to the plane of the drawing, adjacent to the upper cowl 8. The rear air-guiding device 16 is displaced into its first lifting position HS1, as shown in FIG. 3, when the roof element 11 of the roof arrangement 10 is in the ventilation position LU. Finally, FIG. 4 shows the roof element 11 of the roof arrangement 10 in the ventilation position LU with the wind deflector retracted. By contrast, the rear air-guiding device 16 is extended into its second lifting position HS2.

As discussed in more detail below the elements the wind deflector 13 and the rear air-guiding device 16 are adjusted automatically by a control unit CU as a function of the driving speed VF of the motor vehicle 1 and as a function of the position of the roof element 11. In this regard, the driving speed VF refers to the customarily forwardly directed driving movement of the motor vehicle. In all of FIGS. 1 to 4, the driving speed VF of the motor vehicle 1, as sensed by the control unit CU, is indicated by an arrow. The control unit CU is operative to sense the relative position of the roof element 11 and compares the driving speed VF to certain predetermined or predeterminable adjustment values V1-V5 according to the sensed position of the roof element 11, as explained herein. The control unit CU then issues signals for controlling the relative positions of the wind deflector 13 and the rear air-guiding device 16 based on the comparison of the driving speed VF to the adjustment values V1-V5 and based on the sensed position of the roof element 11. If, as shown in FIG. 1, the roof arrangement 10 is in its open position OS, and the driving speed VF of the motor vehicle 1 lies below a first adjustment value V1 of the speed, then the wind deflector 13 is held in its first operative position WS1 and the rear air-guiding device 16 is moved into the first lifting position HS1. If the driving speed VF exceeds a second predetermined adjustment value V2 while the roof arrangement 10 is in its open position OS, then the wind deflector 13 is lowered into its second operative position WS2, and, simultaneously or with a delay, the rear air-guiding device 16 is raised into its second lifting position HS2, as shown in FIG. 2. The predetermined adjustment values V1 and V2 can be the same value.

However, it would be conceivable to increase the second predetermined adjustment value V2 in relation to the first adjustment value V1. If, starting from FIG. 2, the driving speed VF decreases again, and drops below the first predetermined adjustment value V1, the wind deflector 13 is extended again into its first operative position WS1. In addition, the air-guiding device 16 is lowered again into the first lifting position HS1, thus resulting in a configuration of the wind deflector 13 and air-guiding device 16 as illustrated in FIG. 1.

If the roof arrangement 10 is in the ventilation position LU, as shown in FIG. 3, and if the driving speed VF lies below a third adjustment value V3, the rear air-guiding device 16 is displaced into the first lifting position HS1. If the driving speed VF exceeds a fourth adjustment value V4 while the roof arrangement 10 is in the ventilation position LU, the rear air-guiding device 16 is raised into the second lifting position HS2, as shown in FIG. 4. The third and fourth adjustment values V3 and V4 can be the same. If the rear air-guiding device 16 is in its second lifting position HS2 and, starting from FIG. 4, the driving speed VF falls short again of the third adjustment value V3, the rear air-guiding device 16 is lowered again into the first lifting position HS1. Below a fifth adjustment value for the speed, the rear air-guiding device 16 can be displaced into the lowered position AS. In this situation, the fifth adjustment value V5 preferably is smaller than the first adjustment value V1.

It is conceivable for the wind deflector 13 and/or the air-guiding device 16 to be able to approach intermediate positions as a function of increasing and/or decreasing driving speed VF, or for a continuous adjustment between the first and second operative positions WS1 and WS2 and/or between the first and second lifting positions HS1 and HS2 to be possible. This applies particularly for a range of the driving speed VF between the second and third adjustment values V1, V3 if a higher value is provided for the third adjustment value V3 than for V1.

What is claimed is:

1. A method for operating a motor vehicle, the motor vehicle having: a wind deflector arranged adjacent to an upper cowl and being adjustable between a retracted inoperative position, a maximum extended position extended above the inoperative position and an intermediate extended position between the inoperative position and the maximum extended position; a roof arrangement behind the wind deflector and being movable between an open position and a closed position; a rear air-guiding device behind the roof arrangement, the rear air-guiding device being adjustable between a lowered position, an intermediate lifting position above the lowered position and a upper lifting position above the intermediate lifting position; and a control unit operatively connected to the wind deflector, the roof arrangement and the rear air-guiding device for sensing the position of the roof arrangement and for controlling adjustments of the wind deflector and the air-guiding device, wherein the control unit causes the following steps to be carried out for operating the motor vehicle:

sensing an actual driving speed of the motor vehicle,
sensing the position of the roof arrangement,
extending the wind deflector into its maximum extended position and simultaneously moving the rear air-guiding device to the intermediate lifting position if the control unit senses that the roof arrangement is open and that the actual driving speed of the motor vehicle lies below a predetermined first driving speed,
extending the wind deflector into the intermediate lifting position and simultaneously moving the rear air-guiding device to the upper lifting position if the control unit senses that the roof arrangement is open and that the actual driving speed lies above a predetermined second driving speed that is equal to or greater than the predetermined first driving speed,
displacing the rear air-guiding device to the lowered position if the control unit senses that the roof arrangement is not open and that the driving speed is below a predetermined further driving speed
moving the rear air-guiding device to its maximum lifting position if the control unit senses that the roof arrangement is not open and that the actual driving speed reaches a predetermined third driving speed.

2. The method of claim 1, wherein the predetermined first driving speed is less than the second predetermined driving speed, and wherein the control unit further causes the following step to be carried out for operating the motor vehicle
returning the wind deflector to its maximum extended position and simultaneously returning the rear air-guiding device to the intermediate lifting position if the control unit senses that the roof arrangement is open and that the actual driving speed of the motor vehicle is reduced from a speed equal to or greater than the second predetermined driving speed to a speed equal to or below the first predetermined driving speed.

3. The method of claim 1, wherein the motor vehicle includes a roof opening and the roof arrangement includes a sliding roof part that is displaceable relative to the roof opening, the method further comprising displacing the sliding roof part for completely or partially opening the roof opening and achieving the open position.

4. The method of claim 1, further comprising moving the sliding roof element over a fixed roof portion of the roof arrangement for achieving the open position.

5. The method of claim 1, further comprising sensing whether the roof arrangement has been pivoted to a ventilation position, holding the wind deflector in the inoperative position if the control unit senses that the roof arrangement is pivoted to a ventilation position, and adjusting the rear air-guiding device into the intermediate lifting position if the actual driving speed of the motor vehicle is below a third predetermined driving speed.

6. The method of claim 5, further comprising holding the wind deflector in the inoperative position if the roof arrangement is pivoted to the ventilation position, and adjusting the rear air-guiding device from the intermediate lifting position into the upper lifting position if the actual driving speed of the motor vehicle is above a fourth predetermined driving speed that is equal to or greater than the third predetermined driving speed.

7. The method of claim 6, wherein the first and second predetermined driving speeds are equal and the third and fourth predetermined driving speeds are equal.

8. A method for operating a motor vehicle, the motor vehicle having: a wind deflector forward of a roof opening and being adjustable between a retracted inoperative position, a maximum extended position extended above the inoperative position and an intermediate extended position between the inoperative position and the maximum extended position; a roof arrangement behind the wind deflector and being movable between an open position and a closed position relative to the roof opening; an air-guiding device behind the roof arrangement, the rear air-guiding device being adjustable between a lowered position, an intermediate lifting position above the lowered position and an upper lifting position above the intermediate lifting position, and a control unit operatively connected to the wind deflector, the roof arrangement and the rear air-guiding device for sensing the position of the roof arrangement and for controlling adjustments of the wind deflector and the air-guiding device, the method comprising:

sensing an actual driving speed of the vehicle;

using the control unit for comparing the actual driving speed to at least first and second predetermined driving speeds;

using the control unit for determining whether the roof arrangement is in the open position;

moving the wind deflector into the maximum extended position and simultaneously moving the rear air-guiding device to the intermediate lifting position if the roof arrangement is open and if the driving speed of the motor vehicle is below the first predetermined driving speed;

moving the wind deflector to the intermediate extended position and simultaneously moving the rear air-guiding device to the upper lifting position if the roof arrangement is open and if the actual driving speed exceeds the second predetermined driving speed;

moving the rear air guiding device to the lowered position if the actual driving speed of the motor vehicle is below a further predetermined driving speed that is less than the first predetermined driving speed and if the roof arrangement is not in the open position; and moving the rear air-guiding device from the lowered position to its intermediate lifting position when the actual driving speed reaches a third predetermined driving speed that is higher than the further predetermined driving speed if the roof arrangement is not in the open position.

9. The method of claim 8, wherein the first predetermined driving speed is less than the second predetermined driving speed, and wherein the control unit further causes the following step to be carried out for operating the motor vehicle returning the wind deflector to its maximum extended position and simultaneously returning the rear air-guiding device to the intermediate lifting position if the control unit senses that the roof arrangement is open and that the actual driving speed of the motor vehicle is reduced from a speed equal to or greater than the second predetermined driving speed to a speed equal to or below the first predetermined driving speed.

10. The method of claim 8, further comprising holding the wind deflector in the inoperative position if the roof arrangement is pivoted to a ventilation position, and adjusting the rear air-guiding device into the intermediate lifting position if the actual driving speed of the motor vehicle is below a third predetermined driving speed that is greater than the further predetermined driving speed.

11. The method of claim 10, further comprising holding the wind deflector in the inoperative position if the roof arrangement is pivoted to the ventilation position, and adjusting the rear air-guiding device into the upper lifting position if the actual driving speed of the motor vehicle is above a fourth predetermined driving speed.

12. The method of claim 11, wherein the third predetermined driving speed is less than or equal the fourth predetermined fourth driving speed.

13. A motor vehicle comprising:

a roof with a roof opening;

a wind deflector forward of the roof opening and being adjustable between a retracted inoperative position, a maximum extended position extended above the inoperative position and an intermediate extended position between the inoperative position and the maximum extended position;

a sliding roof behind the wind deflector and being movable between an open position and a closed position relative to the roof opening;

an air-guiding device behind the sliding roof, the rear air-guiding device being adjustable between a lowered position, an intermediate lifting position above the lowered position and an upper lifting position above the intermediate lifting position; and a control means for sensing an actual driving speed of the vehicle, comparing the driving speed to at least first and second predetermined driving speeds, determining whether the sliding roof is in the open position, moving the wind deflector into the maximum extended position and simultaneously moving the rear air-guiding device to the intermediate lifting position if the actual driving speed of the motor vehicle is below the first predetermined first driving speed, moving the wind deflector to the intermediate extended position and simultaneously moving the rear air-guiding device to the upper lifting position above the first lifting position if the sliding roof is open and if the actual driving speed exceeds the second predetermined driving speed, moving the rear air-guiding device to the lowered position if the roof arrangement is not in the open position and if the actual driving speed of the motor vehicle is below a further predetermined driving speed that is less than the first predetermined driving speed, and moving the rear air-guiding device from the lowered position to its intermediate lifting position when the actual driving speed reaches a third predetermined driving speed that is higher than the first predetermined driving speed if the roof arrangement is not in the open position.

14. The motor vehicle of claim 13, wherein the sliding roof is pivotable to a ventilation position, and wherein the control means is operative for holding the wind deflector in the inoperative position if the sliding roof is in the ventilation position and for adjusting the rear air-guiding device into the intermediate lifting position if the actual driving speed of the motor vehicle is below the third predetermined driving speed that is greater than the further predetermined driving speed.

15. The motor vehicle of claim 14, wherein the control means further is operative for holding the wind deflector in the inoperative position if the sliding roof is pivoted to the ventilation position and for adjusting the rear air-guiding device into the upper lifting position if the actual driving speed of the motor vehicle is above a fourth predetermined fourth driving speed that is equal to or greater than the third predetermined driving speed.

16. The motor vehicle of claim 13, wherein the control means further is operative for moving the air-guiding device to the lowered position if the actual driving speed of the motor vehicle is below a fifth predetermined driving speed that is less than the first predetermined driving speed.

17. The motor vehicle of claim 13, wherein the first predetermined driving speed is less than the second predetermined driving speed, and wherein the control unit further causes the following step to be carried out for operating the motor vehicle:

returning the wind deflector to its maximum extended position and simultaneously returning the rear air-guiding device to the intermediate lifting position if the control unit senses that the roof arrangement is open and that the actual driving speed of the motor vehicle is reduced from a speed equal to or greater than the second predetermined driving speed to a speed equal to or below the first predetermined driving speed.

* * * * *